US008384965B2

(12) United States Patent
Matsuda

(10) Patent No.: US 8,384,965 B2
(45) Date of Patent: Feb. 26, 2013

(54) COMMUNICATION APPARATUS AND COMMUNICATION SYSTEMS INCLUDING IMAGE DATA RETRANSMITTING UNITS

(75) Inventor: Makoto Matsuda, Aisai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1755 days.

(21) Appl. No.: 11/341,641

(22) Filed: Jan. 30, 2006

(65) Prior Publication Data
US 2006/0170964 A1 Aug. 3, 2006

(30) Foreign Application Priority Data
Jan. 31, 2005 (JP) ................. 2005-023950

(51) Int. Cl.
H04N 1/23 (2006.01)
(52) U.S. Cl. ..................................... 358/300
(58) Field of Classification Search .................. 358/1.14
See application file for complete search history.

(56) References Cited

U.S. PATENT DOCUMENTS

| 5,625,757 | A * | 4/1997 | Kageyama et al. | 358/1.14 |
|---|---|---|---|---|
| 5,684,934 | A * | 11/1997 | Chen et al. | 358/1.14 |
| 6,048,115 | A | 4/2000 | Unishi et al. | |
| 6,115,132 | A * | 9/2000 | Nakatsuma et al. | 358/1.14 |
| 6,804,018 | B1 * | 10/2004 | Mochizuki | 358/1.14 |
| 2002/0015177 | A1 * | 2/2002 | Yamakado et al. | 358/1.15 |
| 2003/0011809 | A1 * | 1/2003 | Suzuki et al. | 358/1.15 |
| 2003/0014368 | A1 * | 1/2003 | Leurig et al. | 705/64 |
| 2003/0164978 | A1 * | 9/2003 | Song | 358/1.18 |
| 2003/0184798 | A1 * | 10/2003 | Enomoto et al. | 358/1.15 |
| 2005/0068564 | A1 * | 3/2005 | Ferlitsch | 358/1.15 |

FOREIGN PATENT DOCUMENTS

| JP | 61/158261 | | 7/1986 |
|---|---|---|---|
| JP | H05-244377 | A | 9/1993 |
| JP | H06-030161 | A | 2/1994 |
| JP | H07-232470 | A | 9/1995 |
| JP | H08-181837 | A | 7/1996 |
| JP | H10-190722 | A | 7/1998 |
| JP | 11/88642 | | 3/1999 |

(Continued)

OTHER PUBLICATIONS

Japanese Patent Office, Notification of Reasons of Rejection for U.S. Appl. No. 2005-023950, dispatched Nov. 18, 2008. (counterpart of above-captioned U.S. patent application).

(Continued)

Primary Examiner — Benny Q Tieu
Assistant Examiner — Jeremiah Bryar
(74) Attorney, Agent, or Firm — Baker Botts L.L.P.

(57) ABSTRACT

A communication system includes a printing apparatus and a data transmitting apparatus configured to transmit image data to the printing apparatus. The printing apparatus includes a printing unit, a recording medium information obtaining unit that obtains information identifying the recording medium on which an image has not be printed normally, and a retransmission requesting unit that requests the data transmitting apparatus to retransmit image data corresponding to the recording medium on which an image has not been printed normally in accordance with the recording medium information. The data transmitting apparatus includes an image data storage unit that stores the image data transmitted to the printing apparatus, and an image data retransmitting unit configured such that, when retransmission of the image data is requested by the printing apparatus, the image data retransmitting unit retrieves the image data from the image data storing unit and transmits te same to the printing apparatus.

14 Claims, 9 Drawing Sheets

FOREIGN PATENT DOCUMENTS

| | | |
|---|---|---|
| JP | H11-196214 A | 7/1999 |
| JP | 2000-188592 A | 7/2000 |
| JP | 2000/238388 | 9/2000 |
| JP | 2003-288195 A | 10/2003 |

OTHER PUBLICATIONS

State Intellectual Property Office, Notification of the First Office Action in Chinese Patent Appl'n. No. 200610003209.9 (counterpart to above-captioned U.S. Appl.) mailed Apr. 4, 2008.

* cited by examiner

RETRY REGISTRATION SERVICE LIST

| SERVICE NAME | USAGE DATE/TIME | SESSOIN ID |
|---|---|---|
| TRANSLATION COPY | 2004/12/24 15:30 | SS1 |
| NEWS DELIVERLY | 2004/12/18 21:10 | SS2 |
| ⋮ | ⋮ | ⋮ |

SERVICE RETRY HISTORY INFORMATION

| SESSOIN ID | USER ID | FILE NAME | POSSIBLE NUMBER OF RETRIES | RETRY DUE |
|---|---|---|---|---|
| SS1 | AA | AAA.*** | 1 | ONE DAY |
| SS2 | SS | BBB.*** | 2 | THREE DAYS |
| ... | ... | ... | ... | ... |

FIG. 9

SERVICE RETRY INFORMATION

| SERVICE NAME | RETRY | POSSIBLE NUMBER OF RETRY(INITIAL VALUE) | RETRY DUE (INITIAL VALUE) | PAGE DESIGNATION METHOD |
|---|---|---|---|---|
| NEWS DELIVERLY | ALLOWED | ∞ | ONE DAY | PAGE INPUT |
| TRANSLATION COPY (ENGLISH TO JAPANESE) | ALLOWED | 1 | ∞ | READING |
| TRANSLATION COPY (ENGLISH TO FRENCH) | NOT ALLOWED | 0 | 0 | × |
| TRANSLATION COPY (JAPANESE TO ENGLISH) | ALLOWED | 3 | ∞ | DETERMINED USING CALCULATION METHOD A |
| ... | ... | ... | ... | ... |

FIG.10

COMMUNICATION APPARATUS AND COMMUNICATION SYSTEMS INCLUDING IMAGE DATA RETRANSMITTING UNITS

CROSS-REFERENCE TO RELATED APPLICATION

This application is related to Japanese Patent Application No. 2005-023950, filed on Jan. 31, 2005. The entire subject matter of the application is incorporated herein by reference.

BACKGROUND

1. Technical Field

Aspects of the invention relates to a data transmission apparatus configured to transmit print data, a printing apparatus configured to receive the print data transmitted from the data transmission apparatus, and a communication system including the data transmission apparatus and the printing apparatus.

2. Description of Related Art

The communication system of the above-described type has been known. An example of such a system is a facsimile system. In the facsimile system, the data transmission apparatus (i.e., a facsimile machine of a transmitting station) transmits image data representing an image of an original scanned by the facsimile apparatus at the transmitting station to a data reception apparatus (i.e., a facsimile machine at a destination station) serving as a printing apparatus. The data reception apparatus (i.e., the facsimile machine at the destination station) receives the image data from the transmission apparatus, and prints the image on a recording sheet. Japanese Patent Provisional Publication No. SHO 61-158261 discloses a facsimile system, in which a facsimile machine at the destination station is powered off when the image data is being received, the facsimile machine transmits data indicating that data is received in an abnormal condition, received date and time, and the page at which the abnormal condition has occurred to the facsimile machine on the transmitting station, thereby requesting for retransmission of the image data.

However, if the recording sheet on which the image is printed is folded or the printed image is thin in its density due to lack of the toner or ink, although the image is not normally printed, the printer does not detect the error condition. In such a case, the retransmission of the image data will not be executed.

SUMMARY OF THE INVENTION

Aspects of the invention are advantageous in that the request for the retransmission of the image data, when the image has not been printed successfully, is performed without fail.

BRIEF DESCRIPTION OF THE ACCOMPANYING DRAWINGS

FIG. 1 is a block diagram showing a configuration of a communication system according to aspects of the invention.

FIG. 2 schematically shows an arrangement of an operation panel provided to an MFP (Multi Function Peripheral).

FIG. 9 shows a configuration of service usage history information stored in a service usage history information storage of the function server, according to aspects of the invention.

FIG. 10 shows a configuration of service retry information stored in a service retry information storage of the function server, according to aspects of the invention.

DETAILED DESCRIPTION

General Overview

Figure 1:
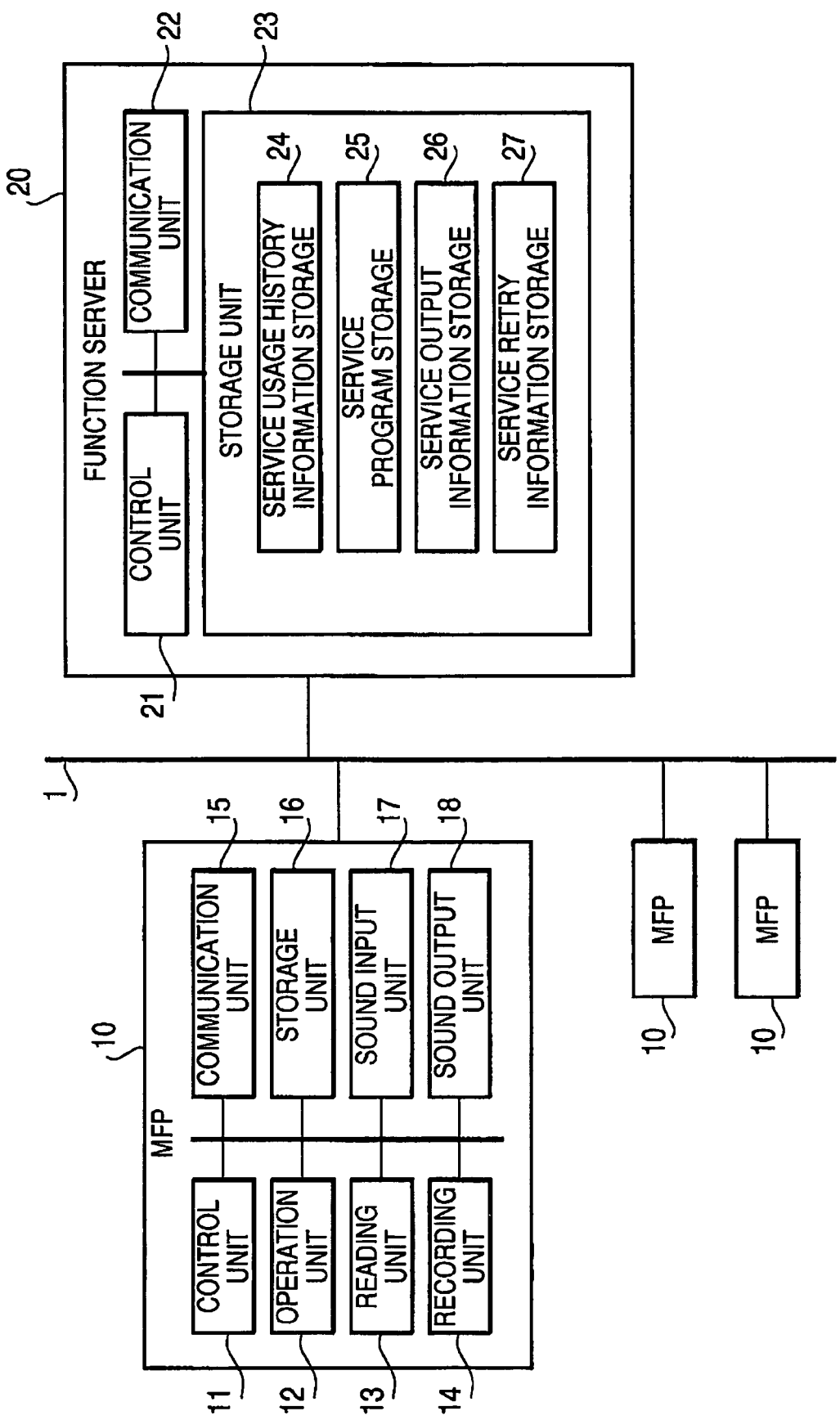

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Aspects of the invention provide a communication system including a printing apparatus and a data transmitting apparatus configured to transmit image data to the printing apparatus, the printing apparatus and the data transmitting apparatus being capable of communicating with each other. The printing apparatus includes a printing unit configured to print an image represented by the image data transmitted from the data transmitting apparatus on a recording medium, a recording medium information obtaining unit configured to obtain information identifying the recording medium on which an image has not be printed normally, and a retransmission requesting unit configured to request the data transmitting apparatus to retransmit image data corresponding to the recording medium on which an image has not been printed normally in accordance with the recording medium information obtained by the recording medium information obtaining unit. The data transmitting apparatus includes an image data storage unit configured to store the image data transmitted to the printing apparatus, and an image data retransmitting unit configured such that, when retransmission of the image data is requested by the printing apparatus, the image data retransmitting unit retrieves the image data from the image data storing unit and transmits the retrieved image data to the printing apparatus.

The recording medium information obtaining unit may include a recording medium information inputting unit allowing a user to input the information identifying the recording medium on which an image has not be printed normally.

The recording medium information obtaining unit may include an image reading unit configured to read an image of a recording medium on which an image has not been printed normally, and the retransmission requesting unit may request the data transmitting apparatus to retransmit image data in accordance with the image read by the image reading unit.

The recording medium information obtaining unit may include an image reading unit configured to read an image of a recording medium on which an image has not been printed normally. The retransmission requesting unit may include a first retransmission requesting unit configured to request the data transmitting apparatus to retransmit image data corresponding to the recording medium on which an image has not been printed normally in accordance with the information input through the recording medium information inputting unit, and a second retransmission requesting unit configured to request the data transmitting apparatus to retransmit image data corresponding to the recording medium on which an image has not been printed normally in accordance with the image read by the image reading unit. The data transmitting apparatus further includes a request selecting unit configured to select the retransmission request of which of the first retransmission requesting unit and the second retransmission requesting unit based on the image data to be transmitted to the printing apparatus. When retransmission of the image data is requested by one of the first retransmission requesting unit and the second retransmission requesting unit selected by the request selecting unit, the image data retransmitting unit retrieves the image data from the image data storing unit and transmits the retrieved image data to the printing apparatus.

The data transmitting apparatus may include a retransmission instructing unit that instructs the printing apparatus to request for retransmission of the image data with the one of the first retransmission requesting unit and the second retransmission requesting unit selected by the request selecting unit, and the printing apparatus may request for the retransmission through the one of the first retransmission requesting unit and the second retransmission requesting unit selected by the request selecting unit instructed by the data transmitting apparatus.

The printing system may be configured to print an identifying image used to identify each recording medium together with the image represented by the image data.

The reading unit may be configured to read the image from a plurality of recording mediums one after another.

The data transmitting apparatus may delete the image data stored in the image data storage unit when image data different from the image data stored in the image data storage unit to the printing apparatus.

The printing apparatus may include a deletion selecting unit configured to allow the user to select image data to be deleted from the image data storage unit of the data transmitting apparatus, and a deletion requesting unit configured to request the data transmitting apparatus to delete the image data selected by the deletion selecting unit. The data transmitting apparatus may include a deleting unit that deletes the image data which is requested to be deleted by the printing apparatus.

The printing apparatus may include a user information inputting unit allowing the user to input user identification information of the user who requests the data transmitting unit for the image data, and a user information transmitting unit configured to transmit the user identification information input through the user information inputting unit to the data transmitting apparatus. The image data storing unit may be configured to store the image data transmitted to the printing apparatus in association with the user identification information of the user who requested for the image data, and the image data storing unit may be configured not to store tie image data if the user who requested for the retransmission of the image data is different from the user who requested for the image data stored in the image data storage unit.

According to aspects of the invention, there is provided a printing apparatus for a communication system including the printing apparatus and a data transmitting apparatus configured to transmit image data to the printing apparatus, the printing apparatus and the data transmitting apparatus being capable of communicating with each other. The printing apparatus may include a printing unit configured to print an image represented by the image data transmitted from the data transmitting apparatus on a recording medium, a recording medium information obtaining unit configured to obtain information identifying the recording medium on which an image has not be printed normally, and a retransmission requesting unit configured to request the data transmitting apparatus to retransmit image data corresponding to the recording medium on which an image has not been printed normally in accordance with the recording medium information obtained by the recording medium information obtaining unit, The recording medium information obtaining unit may include a recording medium information inputting unit allowing a user to input the information identifying the recording medium on which an image has not be printed normally.

The recording medium information obtaining unit may include an image reading unit configured to read an image of a recording medium on which an image has not been printed normally, and the retransmission requesting unit may request the data transmitting apparatus to retransmit image data in accordance with the image read by the image reading unit.

According to aspects of the invention, there is provided a data transmitting apparatus for a communication system including a printing apparatus and the data transmitting apparatus configured to transmit image data to the printing apparatus, the printing apparatus and the data transmitting apparatus being capable of communicating with each other. The data transmitting apparatus may include an image data storage unit configured to store the image data transmitted to the printing apparatus, and an image data retransmitting unit configured such that, when retransmission of the image data is requested by the printing apparatus, the image data retransmitting unit retrieves the image data from the image data storing unit and transmits the retrieved image data to the printing apparatus.

The recording medium information obtaining unit may include a recording medium information inputting unit allowing a user to input the information identifying the recording medium on which an image has not be printed normally.

The recording medium information obtaining unit may include an image reading unit configured to read an image of a recording medium on which an image has not been printed normally, and the retransmission requesting unit may request the data transmitting apparatus to retransmit image data in accordance with the image read by the image reading unit.

According to aspects of the invention, there is provided a computer program product comprising computer readable instructions that cause a computer to function as a printing apparatus or the data transmission apparatus described above.

According to aspects of the invention, there is provided a communication system including a printing apparatus and a data transmitting apparatus configured to transmit image data to the printing apparatus, the printing apparatus and the data transmitting apparatus being capable of communicating with each other. The printing apparatus includes a printing unit configured to print an image represented by the image data transmitted from the data transmitting apparatus on a recording medium, a recording medium information inputting unit allowing a user to input the information identifying the recording medium on which an image has not be printed normally, an image reading unit configured to read an image of a recording medium on which an image has not been printed normally, a first retransmission requesting unit configured to request the data transmitting apparatus to retransmit image data corresponding to the recording medium on which an image has not been printed normally in accordance with the information input through the recording medium information inputting unit, and a second retransmission requesting unit configured to request the data transmitting apparatus to retransmit image data corresponding to the recording medium on which an image has not been printed normally in accordance with the image read by the image reading unit, and a request selecting unit configured to allow a user to select the retransmission request of which of the first retransmission requesting unit and the second retransmission requesting unit, retransmission of the image data being requested using the selected one of the first retransmission requesting unit and the second retransmission requesting unit selected by the request selecting unit. The data transmitting apparatus may include an image data storage unit configured to store the image data transmitted to the printing apparatus, and an image data retransmitting unit configured such that, when retransmission of the image data is requested by the printing apparatus, the image data retransmitting unit retrieves the image data from the image data storing unit and transmits the retrieved image data to the printing apparatus.

Embodiment

Hereinafter, referring to the accompanying drawings, a communication system according to an illustrative embodiment of the invention will be described.

FIG. 1 is a block diagram illustrating a system configuration of the communication system according to an illustrative embodiment. The communication system is provided with multiple MFPs 10, 10, ... and a function server 20, which are connected with each other through a network 1 (which is the Internet, in the illustrative embodiment) so that data communication is performed thereamong.

The MFP 10 is configured to have functions of a telephone (audio communication), a scanner, a printer, a copier, and a facsimile machine. As show in FIG. 1, the MFP 10 includes a control unit 11, an operation unit 12, a reading unit 13, a recording unit 14, a communication unit 15, a storage unit 16, a sound input unit 17 and a sound output unit 18.

The control unit 11 includes a well-known microcomputer provided with a CPU (Central Processing Unit), a ROM (Read Only Memory), a RAM (Random Access Memory) and the like, and controls an entire operation of the MFP 10.

Figure 2:
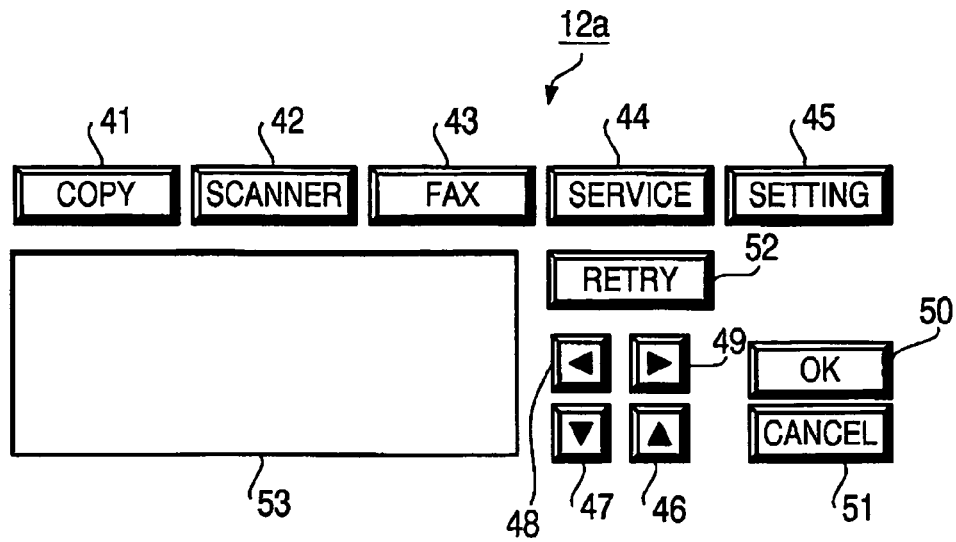

The operation unit 12 includes an operation panel 12a (see FIG. 2) which is provided on a casing (not shown) of the MFP 10. Through the operation panel 12a, the control unit 11 receives user's input. Further, various information is displayed on the operation panel 12a.

Specifically, the operation panel 12a includes input section (key group) that acquire user's input operation. The input section includes a copy key 41, a scanner key 42, a FAX key 43, a service key 44, a set key 45, up/down/left/right keys 46, 47, 48 and 49, an OK key 50, a cancel key 51 and a retry key 52. Further, a display 53 for displaying various pieces of information is provided. When the user input commands through the operation panel 12a, the operation unit 12 transmits the input commands to the control unit 11. The display unit 53 displays various pieces of information in accordance with the input commands.

The scanning unit 13 reads images on an original with a well-known image sensor such as a CCD (Charge Coupled Device) or CIS (Contact Image Sensor) in accordance with a command of the control unit 11, and generates image data representing the read images. Specifically, the reading unit 13 includes an ADF (Auto Document Feeder) which enables the reading unit 13 to read a stack of original sheets placed on tray one after another so that the images on multiple original sheets can be automatically read.

The recording unit 14 is configured to feed multiple recording sheets stacked on a sheet feed cassette (tray) one after another, and form an image on the recording sheet in accordance with a well-known image formation method such as an electrophotographic method, an inkjet printing method and the like. The sheets on which images are formed are discharged from the recording unit 14 and stacked on discharged sheet tray. It should be noted that he images formed by the recording unit 14 includes, for example, images formed by the reading unit 13, facsimile data received by the facsimile function, image data received from an external device such as a personal computer (not shown) or a function server 20.

The communication unit 15 operates to receive/transmit data through the network 1. The storage unit 16 is configured to store various pieces of data in a non-volatile RAM (not shown). The sound input unit 17 acquires sound through a microphone provided to a handset (not shown) of the MFP 10, and generates sound data (PCM data) representing the input sound.

The sound output unit 18 outputs sound represented by the sound data through a speaker provided to the handset and/or through a speaker provided to the may body of the MFP 10.

Next, a configuration of the function server 20 will be described below.

The function server 20 receives a service request from the MFP 10 and provides a service to the MFP 10 that issued the request. The function server 20 is provided with a control unit 21, a communication unit 22 and a storage unit 23.

The control unit 21 includes a well-known microcomputer having a CPU, a ROM and a RAM, and controls an entire operation of the function server 20. The communication unit 22 operates to transmit/receive data through the network 1.

The storage unit 23 is configured to store various pieces of data on a hard disk (not shown). Specifically, the storage unit 23 is provided with a service usage history information storage 24 for storing service usage history information (see FIG. 9), described later, a service program storage 25 for storing a service program (described later), a service output information storage 26 for storing output data (described later), and a service retry information storage 27 for storing service retry information (see FIG. 10).

The service program stored in the service program storage 25 is a program that provides a service to the MFP 10. Specifically, in the service program storage 25, multiple kinds of service programs corresponding to multiple services which can be provided to the MFP 10 are stored. When one of the service programs is executed, the service corresponding to the executed service program is provided to the MFP 10. Specifically, the services include:

a translation copy service that extracts a text from an image read by the reading unit 13 of the MFP 10, translates the extracted text into a target language, converts the translated text into print data representing the image to be printed, and prints using the recording unit 14 of the MFP 10;

a news delivery service that obtains latest new data from a predetermined database, generates print data representing the thus obtained news data, and controls the recording unit 14 of the MFP 10 to print the print data; and a read-aloud service that extracts a text from the image read by the reading unit 13 of the MFP 10, converts the extracted text to sound data, and controls the sound output unit 18 of the MFP 10 to output the thus generated sound data representing the read-around sound of the extracted text.

Next, procedures executed by the communication systems will be explained with reference to flowcharts.

When the user depresses the service key 44 of the operation panel 12a, the MFP 10 displays a service selection window (not shown) allowing the user to select a desired one of multiple kinds of services (which can be provided by the function server 20) on the display 53 of the operation panel 12a. It should be noted that the contents of the services the function server 20 can provide may be stored in the MFP 10 in advance. Alternatively, if data indicating the contents the function server 20 can provide is provided from an external device (e.g., the function server 20 or another device) to the MFP 10, even if the contents may change, the latest service list may be displayed on the display 53 for user's selection.

When the user selects one of the services through the service selection window, which is displayed on the display 53, the MFP 10 next displays an ID input window asking the user to input the user ID and the password on the display 53 of the operation panel 12a.

The user ID and the password are identifying information intrinsic to each user and are necessary for receiving the services provided by the function server 20. The user ID and the password are assigned when the user mad a predetermined registration procedure with respect to a service provider. Typically, the registration procedure can be made through the operation panel 12a of the MFP 10 or a personal computer.

When the user input the user ID and the password through the ID input window displayed on the display 53, the MFP 10 transmits a request for the service selected through the service selection window to the function server 20.

When the request for the service is received, the function server 20 executes a program corresponding to the service and transmits the data corresponding to the service content (e.g., print data, sound data etc., hereinafter simply referred to as output data) to the MFP 10 that issued the service request.

The communication system is configured such that, if the service has not completed normally, the MFP 10 can request for retry (retransmission of the output data) of the service. That is, when the retry key 52 of the operation panel 12a is depressed, the MFP 10 displays a retry service selection window (see FIG. 3A) allowing the user to select a service subjected to the retry on the display 53. Specifically, the MFP 10 is configured such that information related to the service which has not completed normally is stored in the storage unit 16 as a retry registration list (see FIG. 6). The list is displayed as a retry service selection window so that the names of the services which have not completed normally are indicated.

When the user selects a service from among the service names indicated on the retry service selection window displayed on the display 53, similar to a case where the service is requested, the MFP 10 displays the ID input window allowing the user to input the user ID and the password on the display 53 of the operation panel 12a. If the user inputs, through the ID input window, the user ID and the password, the MFP 10 executes a procedure for requesting the function server 20 to retry the service selected through the retry service selection window.

If the function server 20 receives the request for retry of the service from the MFP 10, the function server 20 transmits a page input command to the MFP 10. The page input command is for allowing the user of the MFP 10 to designate pages to be retransmitted (i.e., pages on which images have not been printed normally). Specifically, the function server 20 selects one of the following two designating methods (1) and (2), in accordance with the print data, and using the selected method, asking the user of the MFP 10 to designate the pages to be retransmitted. The methods are:

(1) designating the pages to be retransmitted by controlling the reading unit 13 to read the image of the recording sheets on which the images have not been formed normally; and (2) designating the pages to be retransmitted by having the user to input the page numbers of the recording sheets on which the images have not been formed normally.

Then, the user of the MFP 10 designates the pages to be retransmitted in accordance with the method selected by the function server 20.

For example, if the function server 20 selects method (1), the MFP 10 displays a read/delete selection window (FIG. 3B) allowing the user to select which one of (a) reading of the recording sheets on which images have not been formed normally and (b) deletion of the print data stored in the function server 20 in order to retry the selected service, on the display 53 of the operation panel 12a.

When the user selects the reading of the sheets on which images have not been printed normally in the read/delete selection window (i.e., if "start retry" displayed on the read/delete selection window is selected), the MFP 10 starts reading the sheets placed on the original feeding tray of the reading unit 13, and the page numbers of the sheets the reading unit 13 reads are transmitted to the function server 20 as the page numbers of the sheets on which the images have not been printed normally.

If method (2) is selected by the function server 20, the MFP 10 displays the input/delete selection window (FIG. 3C) allowing the user to select one of (a) inputting of the page numbers of the recording sheets on which images have not been printed normally and (b) deletion of the print data stored in the function server 20 so as to retry the selected service, on the display 53 of the operation panel 12a.

Figure 3A:
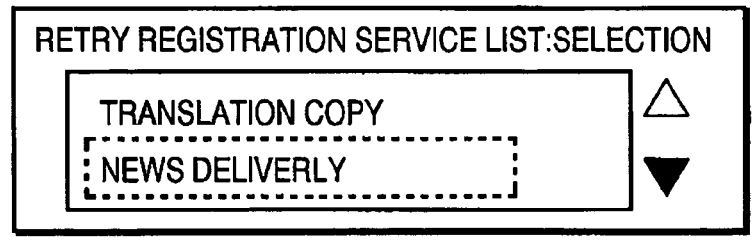
FIGS. 3A, 3B and 3C show retry service selection windows respectively showing different indications.
Figure 3B:
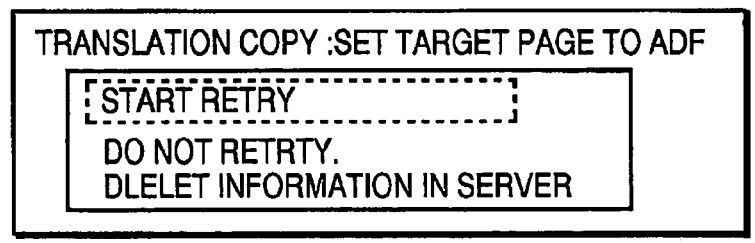
Figure 3C:
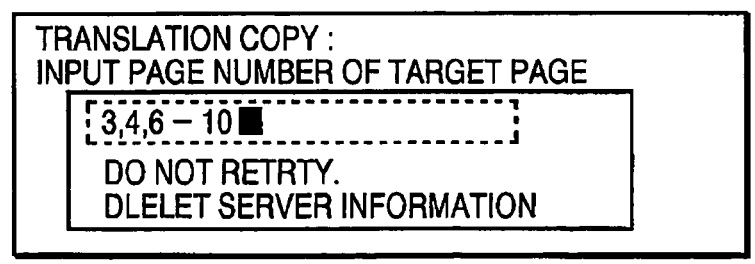

If the user inputs the page numbers of the recording sheets on which the images have not been printed normally through the input/delete selection window (FIG. 3C shows an example in which the page numbers "3, 4, 6-10" are input). The input page numbers are transmitted as the page numbers of the recording sheets on which the images have not been normally printed to the function server 20. That is, the page numbers input by the user of the MFP 10 are transmitted to the function server 20 as the page numbers on which images have not been printed successfully.

It should be noted that, in the above example, the page numbers can be input using the up/down keys 46 and 47 of the operation panel 12a (e.g., the indication of the page number may change as the up/down keys 46 and 47 are depressed repeatedly). However, it is of course possible to provide dedicated keys for inputting the numbers on the operation panel 12a to facilitate the input operation of the page numbers.

As above, the MFP 10 transmits the page numbers of the recording sheets on which images have not been printed successfully to the function server 20, and then the print data corresponding to the transmitted page numbers is transmitted from the function server 20 to the MFP 10.

If the deletion of the print data stored in the function server 20 is selected in order to retry the selected service in the read/delete selection windows shown in FIG. 3B or FIG. 3C (i.e., the "Not retry, Delete information in Server" is selected, a process of requesting the function server 20 to delete the print data corresponding to the service selected through the service selection window (FIG. 3A). Then, the print data requested to be deleted is deleted from the function server 20.

Next, various procedures executed by the control unit 11 of the MFP 10 and the control unit 21 of the function server 20 will be described.

MFP Procedure

Service Usage Procedure

First, a service usage procedure will be described. The service usage procedure is executed by the control unit 11 of the MFP 10 when the user has selected a service through the service selection window displayed on the display 53 of the operation panel 12a, and further input the user ID and the password through the ID input window.

It should be noted that the service usage procedure differs depending on the selected service (e.g., whether the image of the original is to be scanned using the reading unit 13). In the following description, a case where a translation copy service has selected will be described.

Figure 4:
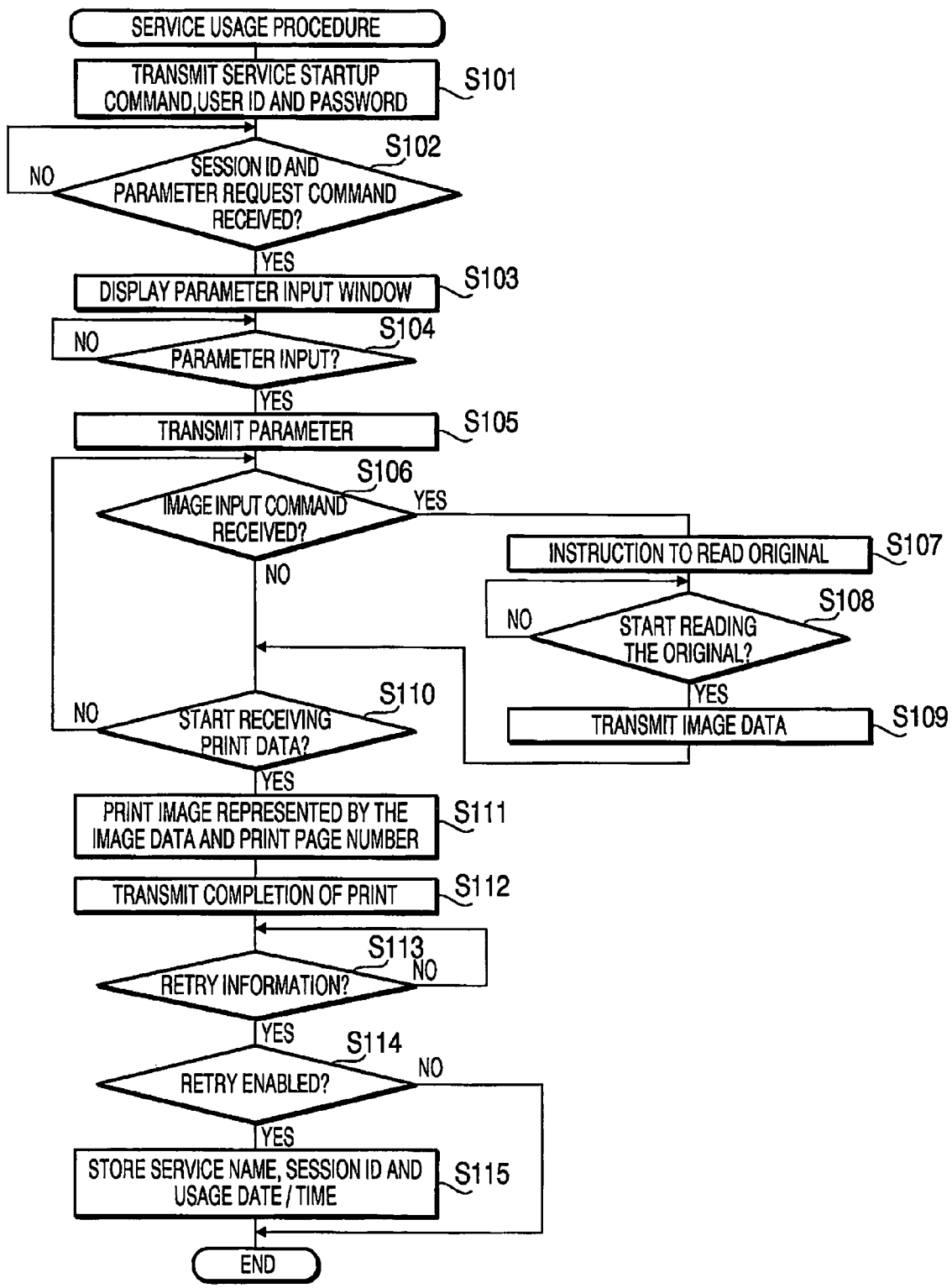
FIG. 4 shows a flowchart illustrating a service usage procedure according to aspects of the invention.

FIG. 4 shows a flowchart illustrating the service usage procedure.

When the service usage procedure is executed, the control transmits a service startup command for requesting the function server 20 for the service (i.e., the translation copy service in this illustrative example) selected through the service selection window, and the user ID and the password (for the user requesting the service) input through the ID input window to the function server 20.

In S102, the control judges whether the session ID and the parameter request command, which have been transmitted form the function server 20 in response to the transmission of the service startup command in S101, have been received. If the session ID and the parameter request command have been received, the control proceeds to S103. It should be noted that the session ID is identifying information intrinsic to each service request, and used for distinguishing communications related to multiple service commands, on the function server 20 side, from each other.

Specifically, in some of the following steps (i.e., S105, S109, S116 and S118) of the service usage procedure, the MFP 10 transmits data to be transmitted to the function server 20 together with its session ID. The function server 20 determines which service request the received data is related to based on the received session ID. It should be noted that the session ID is generated in S301 of a translation copy service procedure (FIG. 8) and transmitted to the MFP 10 that issued the service startup command together with the parameter request command in S302.

In S103, the control displays a parameter input window allowing the user to set parameters necessary for the service (i.e., for the translation copy service, in this example) on the display 53 of the operation panel 12a based on the received parameter request command. Specifically, the parameter request command includes XML (extensible Markup Language) data representing the parameter input window (see FIG. 5), and the MFP 10 displays the parameter input window on the display 53 based on the XML data.

Figures 5, 6:
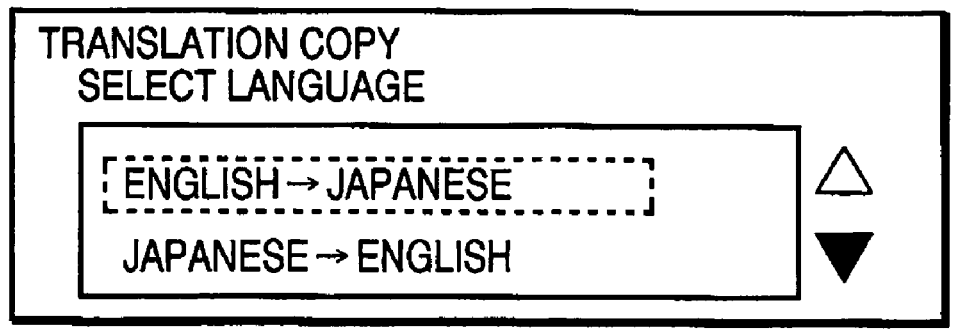
FIG. 5 shows a parameter input window according to aspects of the invention.
FIG. 6 shows a configuration of a retry registration service list stored in a storage unit of the MFP according to aspects of the invention.

In this example, multiple kinds of parameters representing target languages of the translation copy service (i.e., "English→Japanese", "Japanese→English", etc.) are displayed. By depressing the up key 46 or the down key 47, a cursor (a rectangle drawn by broken lines in FIG. 5) for selecting a parameter is moved upward or downward to highlight the selected parameter, and by depressing the OK key 50, the highlighted parameter is selected. It should be noted that, as the translation target language, further parameters (e.g., "English→French", "French→English) are available. However, due to a limited display area of the display 53, all the parameters cannot be displayed on the display 53 simultaneously. Therefore, the parameter input window is configured such that a parameter displaying area can be scrolled in either upper and lower directions. As shown in FIG. 5, a black one of the triangles (arrows) pointing upper/lower directions indicates that there are hidden parameters in that direction. It should be noted that some services may not require parameter settings. In such a case, the parameters may not be received in S102, and thus steps S103-S105 may not be executed.

In S104, the control pauses until the user inputs a parameter (in this example, until the user selects a parameter) through the parameter input window displayed in S103. When the user inputs the parameter, the control proceeds to S105.

In S105, the parameter (i.e., "English→Japanese", "Japanese→English", etc.) input by the user in S104 is transmitted to the function server 20. Then, in S106, the control judges whether the image input command transmitted, in response to the transmission of the parameter in S105, from the function server 20 is received. The image input command is transmitted from the function server 20 only when the reading of the original is necessary for providing the service. In this example, the original subjected to the translation should be read. The image input command is transmitted in S304 of a translation copy service procedure (FIG. 8), described later, which is executed by the control unit 21 of the function server 20, to the MFP 10.

If the image input command has been received (S106: YES), the control proceeds to S107.

In S107, the control displays a message (e.g., "set the original and depress the OK key") asking the user to operate the reading unit 13 to read the original subjected to the translation copy service on the display 53 of the operation panel 12a.

In S108, the control pauses until reading of the original by the reading unit 13 is started (i.e., until the user operates to start reading the original), and, when started, the control proceeds to S109.

In S109, the control starts transmitting the image data representing the image on the original (i.e., the image data generated by the reading unit 13) to the function server 20. Then, the control proceeds to S110.

If the control determines that the image input command has not been received (S106: NO), the control directly proceeds from S106 to S110.

Next, in S110, the control judges whether reception of the print data transmitted from the function server 20 is started. If not (S110: NO), the control returns to S106. When started (S110: YES), the control proceeds to S111.

In S111, the control controls the recording unit 14 to print the image represented by the print data received form the function server.

Specifically, in addition to the image represented by the print data, a barcode representing the page number is printed at a predetermined position (e.g., upper left portion) of the recording sheet, the recording sheet can be identified. It should be noted that the page number (barcode) is printed here makes it possible that the page number can be identified later by reading the image of the recording sheet in S213 of the service retry procedure (FIG. 7) described later. Therefore, the item to be printed on the recording sheet to indicated the page number need not be the barcode, and any other suitable item (e.g., the page number itself) may be used. The page number (barcode) printed here is a surplus image which is different from the original image represented by the print data. Therefore, it is preferable that the page number (barcode) is printed with obscure color or thickness, in small size, at a position close to the corner of the recording sheet, and the like. If it is known in advance that the image of the recording sheet need not be read using the reading unit 13 (i.e., it is unnecessary to recognize the page number of the recording sheet by reading the image thereof) (for example, when the service does not allow the retry, or the page number is input through the operation panel 12a and unnecessary to extract from the image of the recording sheet), the page number need not be printed.

In S112, the control transmits the print completion notification indicating the completion of printing of the print data to the function server 20.

In S113, the control judges whether the retry information, which is transmitted from the function server 20 in response to the print completion notification sent in S112, is received. If received (S114: YES), the control proceeds to S114. It should be noted that the retry information represents whether the retry of the service that is requested in the service usage procedure is allowed. That is, according to the communication system, whether the retry is allowed, and the number and term of the retry when allowed, are determined in advance, and stored in the service retry information storage 27 of the storage unit 23 of the function server 20 as service retry information (see FIG. 10). When the function server 20 receives the print completion notification from the MFP 10, the function server 20 transmits the retry information indicating whether the retry regarding the service is allowed to the MFP 10. It should be noted that the retry information is transmitted in S311 or S312 of the translation copy service procedure (FIG. 8), described later, executed by the control unit 21 of the function unit 20 to the MFP 10 that issued the print complete notification.

In S114, the control judges whether the received retry information indicates that the retry is allowed. If the control determines that the retry is allowed (S114: YES), the control proceeds to S115, and as shown in FIG. 6, the control stores the name of the requested service (the translation copy service, in this example), the data/time when the service usage procedure was started (usage date/time), and the session ID (i.e., the session ID received from the function server 20) in the storage unit 16 as the information regarding the service requested in the past (i.e., the retry registration service list). Thereafter, the control finishes the service usage procedure. It should be noted that the information stored here will be used when the retransmission of the print data is requested or deletion of the print data is requested.

If the retry information does not indicate the allowance of retry (S114: NO), the control finishes the service usage procedure. That is, by not storing the information related to the requested service in the storage unit 16, the retry of the service is inhibited.

Next, the service retry procedure executed by the control unit 11 of the MFP 10 will be described. The service retry procedure is executed when a service is selected through the retry service selection window (FIG. 3A) displayed on the display 53 of the operation panel 12a of the MFP 10, and the user ID and the password are input through the ID input window.

When the service retry procedure is started, in S201, the control transmits the retransmission command for requesting the function server 20 to retransmit the print data, session ID corresponding to the service selected through the retry service selection window (i.e., the session ID stored in the storage 16 in association with the selected service name as shown in FIG. 6), the user ID and the password input through the ID input window to the function server 20.

It should be noted that in the following steps in the service retry procedure (i.e., S214, S218, S221 and S222), the MFP 10 transmits the data to be transmitted together with the session ID, to the function server 02. The function server 20 determines to which service (print data) the data corresponds to based on the received session ID.

Next, in S202, the control judges whether information transmitted from the function server 20, in response to the retransmission command in S201, is received. If received, the control proceeds to S203. It should be noted that the information received here indicates whether the function server 20 can transmit the print data. For example, when the transmitted password was wrong or the print data corresponding to the transmitted session ID is not stored in the service output information storage 26, information indicating an error status is received.

In particular, if the transmitted user ID does not coincide with the user ID stored in the service usage history information storage 24 of the storage unit 23 of the function server 20 as the service usage history information, information indicating that the user IDs do not match is received. It should be noted that the information received here is transmitted in S403, S404 or S406 of the output information transmission procedure (FIG. 11), described later, executed by the control unit 21 of the function unit 20 to the MFP 10 that issued the retry command.

In S203, the control judges whether the information received in S202 indicates the error state. If the received information indicates the error state (S03: YES), the control proceeds to S204, and displays an error message on the display 53 of the operation panel 12a. Then, the control finishes the service retry procedure.

If the control determines that the received information does not indicate the error state (S203: NO), the control proceeds to S206 and displays a message indicating that the user IDs do not coincide with each other on the display 53 of the operation panel 12a.

Further, in S207, the control deletes the information (service name, usage data/time, and session ID) corresponding to the print data of which retransmission is requested from among the information (FIG. 6) related to the service requested in the past and stored in the storage unit 16. Thus, if a different user ID has been input, the control disables the retry of the service. Then, the control finishes the service retry procedure.

If the control determines that the received information does not indicate that the user IDs do not coincide (i.e., the information indicating a normal state) (S205: NO), the control proceeds to S208 and judges whether the page input command transmitted from the function server 20 is received. If received (S208: YES), the control proceeds to S209. The page input command is for allowing the user of the MFP 10 to designate the pages to be retransmitted (i.e., the pages on which images have not been printed successfully) among all the pages on which images represented by the print data have been printed on the recording sheet.

Specifically, one of a method of designating pages to be retransmitted by controlling the reading unit 13 to read the recording sheets on which the images have not been printed normally (i.e., method (1) above, which will also be referred to as a first retry), and a method of asking the user to input the page numbers of the recording sheets on which images have not been printed normally through the operation panel 12a of the operation unit 12 (i.e., method (1) above, which will also be referred to as a second retry) is received.

It should be noted that the page input command is transmitted in S408 or S409 of the output information transmission procedure (FIG. 11) executed by the control unit 21 of the function server 20 to the MFP 10 that issued the retransmission command.

In S209, the control judges whether the received page input command is for the first retry.

If the received page input command is for the first retry (S209: YES), the control proceeds to S210, and displays the read/delete selection window (FIG. 3B) for allowing the user to select one of (a) reading of the recording sheets on which image have not been printed normally and (b) deletion of the print data stored in the function server 20 in order to retry the selected service, on the display 53 of the operation panel 12a.

In S211, the control judges whether deletion of the print data stored in the function server 20 is selected through the read/delete selection window (specifically, whether item "Not retry, and Delete the Information on Server" is selected).

If the control determines that the deletion of the print data is not selected (S211: NO), the control proceeds to S212 and judges whether the reading of the recording sheets on which images have not been printed normally is selected through the read/delete selection window (specifically, whether item "Start Retry" is selected).

If the control determines that the reading of the recording sheets is not selected (S212: NO), the control returns to S211. That is, one of the reading of the recording sheets and deletion of the print data is selected, the process repeats steps S211 and S212.

If the control determines that the reading of the recording sheets is selected (S212: YES), the control proceeds to S213 and controls the reading unit 13 to read the image of the original (i.e., the recording sheets on which the images cannot be printed normally) set to the original feed tray. Then, by analyzing the barcode (if the page number is indicated by the barcode) included in the image read by the reading unit 13, the control recognizes the page numbers of the sheets read by the reading unit 13. It should be noted that, if the barcode cannot be read, the control unit may stop the retry processing by notifying the function server 20 of the state that the barcode cannot be read. Optionally, in such a case, the process may be configured such that the page numbers can be input through the operation panel 12a of the operation unit 12.

In S214, the control transmits the page numbers recognized in S213 (i.e., the page numbers of the sheets on which the images have not printed normally) to the function server 20. Then, the control proceeds to S219.

In S209, if the control judges that the received page input command is not for the first retry (i.e., for the second retry), the control proceeds to S215. In S215, the control displays the input/delete window (FIG. 3C) allowing the user to select one of (a) input of the page numbers of the recording sheets on which images have not been printed normally, or (b) deletion of the print data stored in the function server 20 in order to retry the selected service on the display 53 of the operation panel 12a.

In S216, the control judges whether the deletion of the print data is selected (i.e., whether the item "Not Retry and Delete Server Information" is selected) through the input/delete selection window.

If the deletion of the print data is not selected (S216: NO), the control proceeds to S217 and judges whether the page numbers of the recording sheets on which images have not been printed normally have been input through the input/delete selection window.

If the control determines that the page numbers have not been input (S217: NO), the control returns to S216. That is, until one of the page numbers and the deletion of the print data is selected, steps S216 and S217 are repeated.

If the control determines that the page numbers have been input, the control proceeds to S218, and transmits the input page numbers to the function server 20. Then, the control proceeds to S219.

In S219, the control judges whether the reception of the print data (i.e., the print data corresponding to the transmitted page numbers) transmitted from the function server 20 in response to the transmission of the page numbers in S214 or S218 has been received. If the reception is started (S219: YES), the control proceeds to S220.

In S220, the control controls the recording unit 14 to print the images represented by the print data received from the function server 20. Specifically, the control controls the recoding unit 14 to print the images represented by the print data and further barcodes representing the page numbers on a predetermined position on each recording sheet so that each recording sheet can be identified.

Next, in S221, the control transmits the print completion notification notifying that the printing of the images represented by the received print data has been completed to the function server 20. Then, the control finishes the service retry procedure.

If the control determines that the deletion of the print data is selected in S211 or S216, the control proceeds to S222 and transmits the deletion command requesting the function server 20 to delete the print data to the function server 20. The, the print data stored in the service output information storage 26 of the function server 20 (i.e., the print data corresponding to the service selected through the retry service selection window shown in FIG. 3A) will be deleted.

Then, in S223, the control displays a message that deletion of the print data has been completed on the display 53 of the operation panel 12a.

Next, in S224, the control deletes, among the information related to the services requested in the past and stored in the storage unit 16 (see FIG. 6), the information (i.e., the service name of the services for which the printing has been completed, the usage date/time and the session ID) related to the deleted print data. Then, the control finishes the service retry procedure.

Procedures of Function Server

Figure 8:
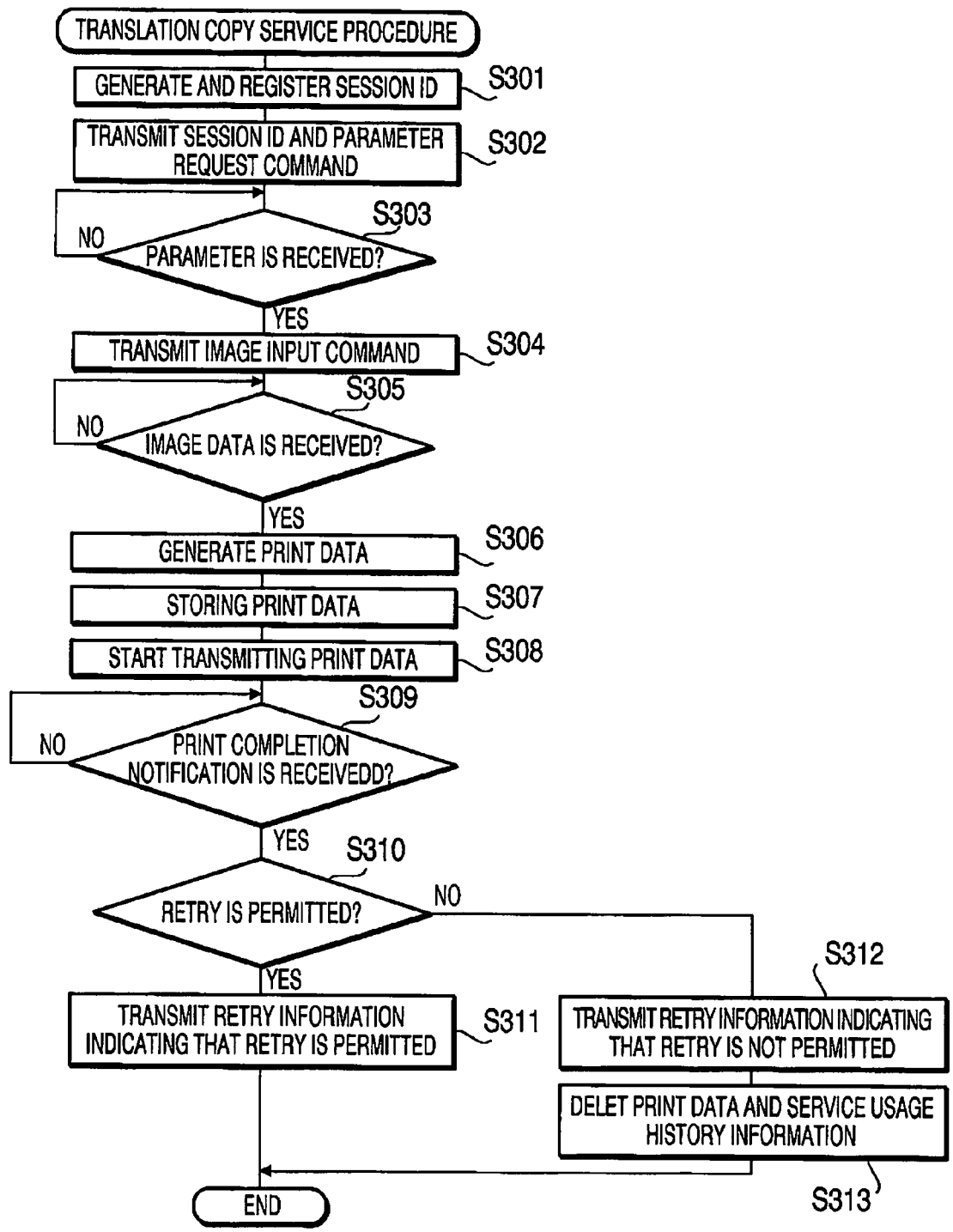
FIG. 8 shows a flowchart illustrating a translation copy service procedure according to aspects of the invention.

Next, the translation copy service procedure executed by the control unit 21 of the function server 20 will be described with reference to the flowchart shown in FIG. 8 will be described. The translation copy service is executed when the function server 20 receives a service startup command requesting for the translation copy service from the MFP 10. It should be noted that the service startup command is transmitted in S101 of the service usage procedure (FIG. 4).

When the translation copy service procedure is started, in S301, session IDs intrinsic to respective service requests are generated, and the thus generated session IDs are stored in the service usage history information storage 24 as service usage history information. Specifically, as shown in FIG. 9, the service usage history information storage 24 stores, as the service usage history information, the session ID for identifying each service request, and, as information corresponding to the session ID, the user ID, a file name, the number of possible retries and the term of the retry are stored. Here, the user ID represents the user ID transmitted from the MFP 10 together with the service start up command (i.e., the user ID of the user who requested the service), and is registered when the service startup command is received. The file name represents the file name of the print data transmitted to the MFP 10 for providing the service, and is registered when the print data is generated. The number of possible retries represents the number of times the retry can be repeated, and the initial value of which is registered when the service startup command is received. As the retry request is received form the MFP 10, the number of possible retries is decremented by one. The term of the retry represents the term within which the retry can be performed. The initial value of the term is also registered when the service startup command is received, and as time elapses, the term is decremented. As will be described later, the initial values of the number of retries and the term of retry are stored in the service retry information storage 27 as the service retry information (FIG. 10).

Is S302, the control transmits the session ID generated in S301 and the parameter request command requesting for the setting of the parameters necessary for the service to the MFP 10.

In S303, the control judges whether the parameter, which is transmitted from the MFP 10 in response to the parameter request command transmitted in S302, is received. If received (S303: YES), the control proceeds to S304. It should be noted that the parameter is transmitted in S105 of the service usage procedure (FIG. 4).

In S304, the control transmits the image input command requesting for the transmission of the image data representing the image of the original subject to the translation of the translation copy service to the MFP 10.

Then, in S305, the control judges whether the image data (which is generated by the reading unit 13 of the MFP 10 by reading the original) transmitted, in response to the transmission of the image input command in S304, from the MFP 10 is received. If received (S305: YES), the control proceeds to S306. It should be noted that the image data is transmitted in S109 of the service usage procedure (FIG. 4).

In S306, the control generates the print data Specifically, the control applies the OCR (Optical Character Recognition) to the image data received from the MFP 10 to recognize and extract the text included therein. Then, the control executes the translation process (i.e., the translation process in accordance with the parameter received in S303) with respect to the extracted text. Further, the control sets a print layout to the translated text, thereby generating the print data representing the image of the translated text.

In S307, the control stores the print data generated in S306 in the service output information storage 26 of the storage unit 23. Next, the control transmits the print data generated in S306 to the MFP 10 (S308).

In S309, the control judges whether the print completion notification indicating that the printing has completed form the MFP 10. If received (S309: YES), the control proceeds to S310.

In S310, the control judges whether the retry is allowed with respect to the service provided, based on the service retry information stored in the service retry information storage 27 of the storage unit 23. As shown in FIG. 10, in the service retry information storage 27, as the service retry information, a plurality of service names and corresponding retry conditions (e.g., whether the retry is allowed, the initial value of the possible retries, the initial term of the retry term, and the page designating method) are stored as fixed values.

The information indicating whether the retry is allowed represents whether the retry of a service is possible. "Allowed" means that the retry is possible, while "Inhibited" represents that the retry is inhibited. In the example shown in FIG. 10, the retry is not allowed regarding the English→French translation copy service. The initial value of the possible retries represents the maximum number of the retries. The initial value of the term of retry represents the term (with respect to the time at which the service is requested). The page designating method represents a method of designating the pages to be retransmitted. "Read" represents the method of controlling the reading unit 13 to read the image on the recording sheets on which images have not been printed normally to designate the pages to be retransmitted (i.e., the first try), and "Page Input" represents the method of inputting the page numbers through the operation panel 12a (i.e., the second retry). Further, in this example, "Determine with Calculation Method A" means that the input method is the "Page Input" if the total number of pages of the images represented by the print data is less than 10, while the method is "Read" if the tonal number of pages is 10 or greater.

That is, if the number of pages represented by the print data generated in the translation copy service of Japanese→English, and the retransmission of the print data is requested, by controlling the reading unit 13 to read the image of the recording sheets on which the images have not been printed, the pages to be retransmitted are designated. The reason why the designating method is the "Reading" when the number of pages is relatively large is to facilitate the designation of the page numbers. In S310, if the retry is allowed form the provided service and each of the number of the possible retries and the term of the retry is not zero, the control determines that the retry is allowed.

When the retry for the provided service is allowed (S310: YES), the control proceeds to S311, and transmits the retry information allowing the retry to the MFP 10. Then, the control finishes the translation copy service procedure.

If the control determines that the retry is not allowed with respect to the provided service (S310: NO), the control proceeds to S312, and transmits the retry information indicating that retry is not allowed to the MFP 10.

In S313, the control deletes the print data and the service usage history information. Specifically, the control refers to the service usage history information (FIG. 9) stored in the service usage history information storage 24, and based on the file name stored therein regarding the session ID received together with the print completion notification, the control deletes the print data corresponding to the session ID from among the print data stored in the service output information storage 26, and further deletes the service usage history information (i.e., user ID, session ID, file name, the number of possible retries and the retry term) corresponding to the session ID. Then, the control finishes the translation copy service procedure.

Figure 7:
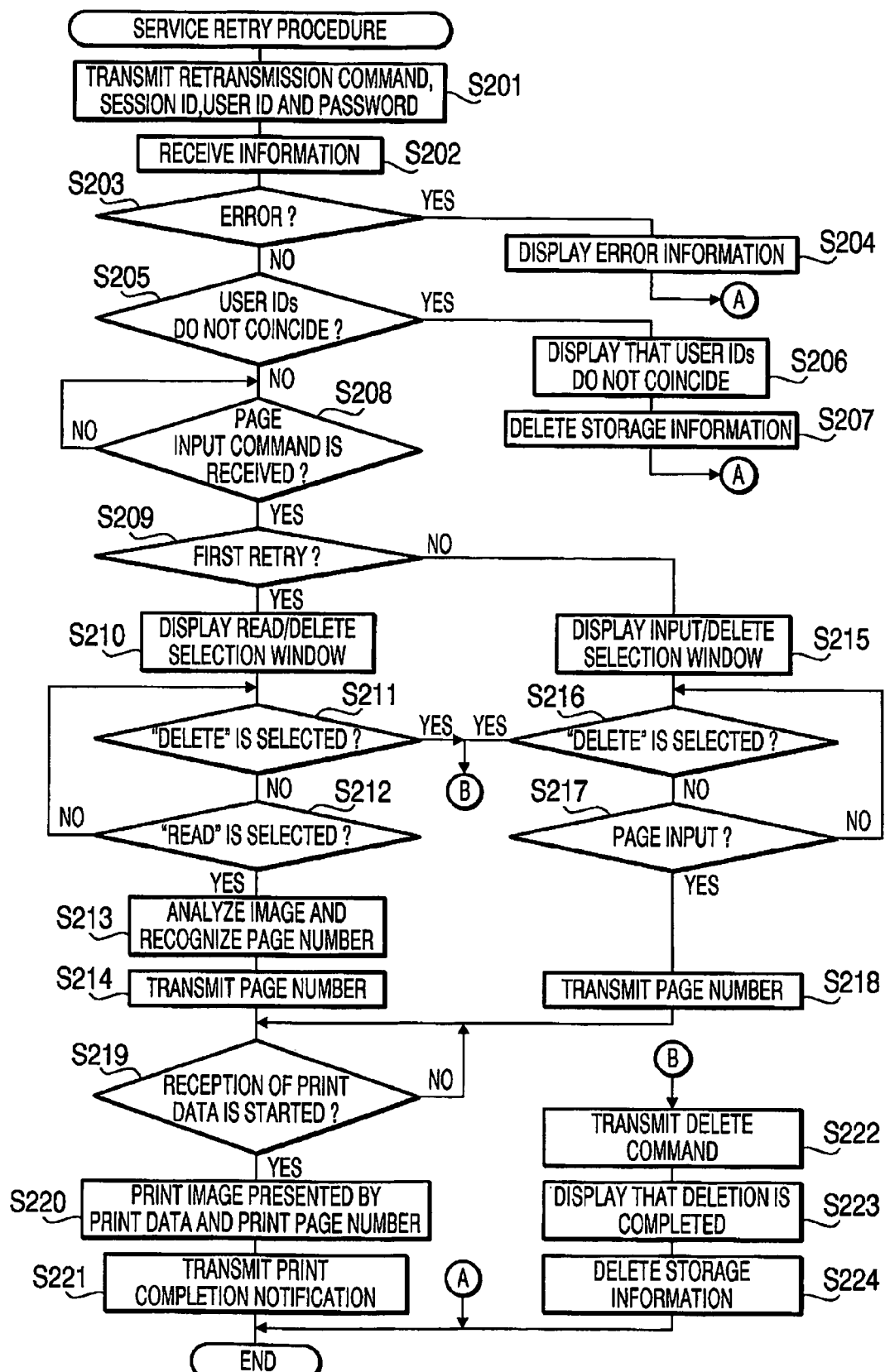
FIG. 7 shows a flowchart illustrating a service retry procedure according to aspects of the invention.
Figure 11:
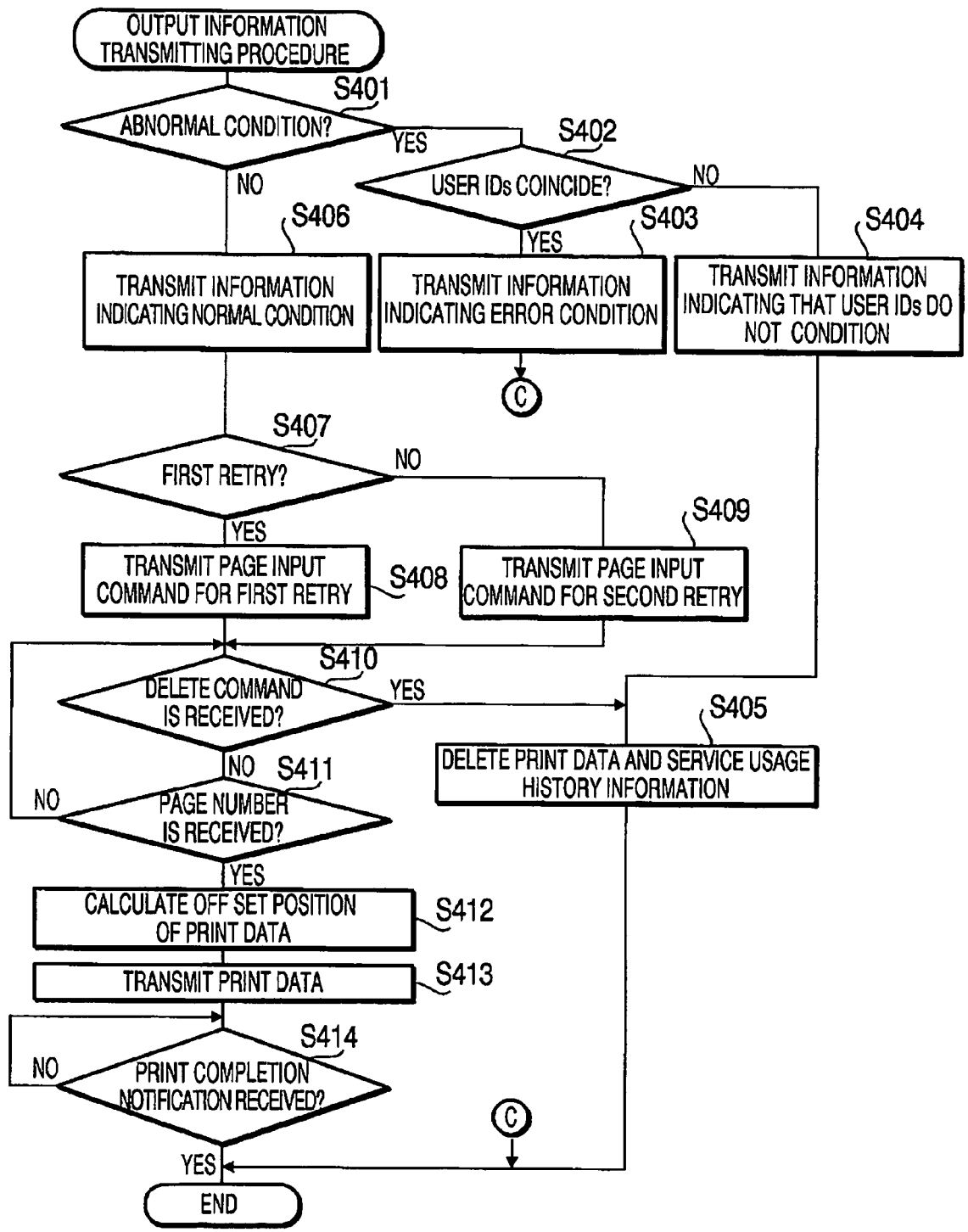
FIG. 11 shows a flowchart illustrating an output information transmitting procedure according to aspects of the invention.

Next, the output information transmission procedure executed by the control unit 21 of the function server 20 will be described with reference to the flowchart shown in FIG. 11. The output information transmission procedure is executed when the retransmission command is received from the MFP 10. The retransmission command is transmitted in S210 of the service retry procedure (FIG. 7).

If the output information transmission procedure is started, in S401, the control judges whether an abnormal condition occurs in the information (i.e., session ID, user ID and password) received together with the retransmission command. Specifically, the control determines that the abnormal condition occurs when the password received together with the retransmission command is wrong, or the user ID received together with the retransmission command and the user ID corresponding to the session ID received together with the retransmission command (i.e., the user ID stored in association with the session ID received together with the retransmission command in the service usage history information (FIG. 9) in the service usage history information storage 24) do not coincide with each other.

If the control determines that the abnormal condition occurs (S401: YES), the control proceeds to S403 and transmits information indicating an error state to the MFP 10. Then, the control finishes the output information transmission procedure.

If the control determines that the user IDs do not coincide with each other (S402: NO), the control transmits information indicating that the user IDs do not coincide to the MFP 10 (S404).

In S405, the control deletes the print data and the service usage history information. Specifically, the control refers to the service usage history information (see FIG. 9) stored in the service usage history information storage 24, and based on the file name corresponding to the session ID received together with the retransmission command, deletes the print data corresponding to the session ID among the print data stored in the service output information storage 26 and the service usage history information (i.e., the user ID, the session ID, the file name, the number of possible retries, and the term of the retry) registered in association with the session ID. Then, the control finishes the output information transmission procedure. With this configuration, if different user IDs are received, the retry of the service is prohibited.

On the contrary, if the control determines that abnormal condition does not occur (S401: NO), the control proceeds to S406, and transmits information indicating the normal condition to the MFP 10.

In S407, the control judges which of the first and second retries is to be used as the page designation method. Specifically, the control selects one of the page designation methods based on the page designation method of the service retry information stored in the service retry information storage 27.

If the control determines that the first retry is selected (S407: YES), the control proceeds to S408, and transmits the page input command for the first retry to the MFP 10. Then, the control proceeds to S410.

If the control determines that the second retry is selected (S407: NO), the control proceeds to S409, and transmits the page input command for the second retry to thee MFP 10. The, the control proceeds to S410.

In S410, the control judges whether the deletion command is received from the MFP 10. If the control determines that the deletion command is received (S410: YES), the control proceeds to S405 and deletes the print data and the service usage history information. Then, the control finishes the output information transmission procedure.

If the control determines that the deletion command is not received from the MFP 10 (S410: NO), the control proceeds to S411 and further judges whether the page number is received from the MFP 10. IF the control determines that the page numbers have not been received (S411: NO), the control returns to S410. Thus, until the deletion command or the page number is received, steps S410 and S411 are repeated.

If the control determines that the page numbers have been received (S411: YES), the control proceeds to S412 and calculates an offset position of the print data. Specifically, the control refers to the service usage history information (see FIG. 9) stored in the service usage history information storage 24, and based on the file name stored in association with the session ID received together with the page number, the control retrieves the print data corresponding to the session ID from among the print data stored in the service output information storage 26. Then, based on the received page number, the portion of the print data to be retransmitted is determined. For example, if the received page number is "4", the control obtains the position after the 4th page in the print data.

In S413, the control transmits portion of the print data corresponding to the images which have not been printed normally on the recording sheets based on the offset position calculated in S412.

Next, in S414, the control judges whether the print completion notification indicating that the printing has completed is received from the MFP 10. If received (S414: YES), the control finishes the output information transmission procedure.

According to the illustrative embodiment described above, the user of the MFP 10 may check the recording sheets on which the images have not been printed, based on the print data transmitted from the function server 20, normally. Then, the user can transmit the page numbers of print data to be retransmitted from the MFP 10 to the function server 20 (S214, S218). Then, the function server 20 transmits the print data corresponding to the page numbers to the MFP 10 (S413). Therefore, according to the communication system described above, even if deterioration of print quality (e.g., thin density image due to lack of toner, folded recording sheets, and the like) which may not be normally detected by the MFP 10 occurs, based on the user's judgment, the retransmission of the print data can be requested.

According to the illustrative embodiment, since the number of retries are limited. Therefore, in a communication system in which the function server 20 charges a certain fee for a service request from the MFP 10, it is possible to prevent the unauthorized repetitive retries can be prevented.

Further, according to the illustrative embodiment, as a method of designating the pages (print data) to be retransmitted, the first retry and the second retry are available. Which retry is used is instructed by the function server 20, in accordance with the contents of the print data, to the MFP 10 (S407-S409). Therefore, the page numbers can be designated with suitable method depending on the print data. For example, if the number of the recording sheets is relatively large (i.e., more than a predetermined value), it may be troublesome for the user to count the pages. In such a case, it is preferable that the first retry is used. On the other hand, if the number of pages is relatively small (i.e., the number is less than the predetermined value), it may be relatively easy to count the pages to identify the pages on which images have not been normally printed. Further, in such a case, to control the reading unit 13 to read the images may be more troublesome for the user than to count the pages. Therefore, in such a case, the second retry is used.

According to the illustrative embodiment, the MFP 10 is configured to print the barcode representing the page number (S111, S220). Therefore, the page number of each page can be recognized by the reading unit 13 easily. Further, since the reading unit 13 is provided with an ADF, the user of the MFP 10 is only necessary to set the recording sheets on which the images have not been printed normally even though the number of pages is relatively large. Since the user need not count the number of pages. Thus, the user can easily designate the page numbers.

In the illustrative embodiment, by the input of the user through the MFP 10, the print data stored in the service output information storage 26 of the function server 20 can be deleted (S211: YES, S216: YES, S222, S405). Therefore, unnecessary print data can be deleted with the necessary print data being retained.

Further, according to the illustrative embodiment, the function server 20 judges whether the user who requested for the service coincides with the user who requested for retransmission of the print data regarding the service based on the user ID. If the users are different, the print data is deleted (S402:

NO, S405). Therefore, it is ensured that the print data will not be retransmitted to a user different from the user who requested for the service. Therefore, for example, it is prevented that print data including confidential information is transmitted to another user. Further, when the function server 20 is configured to charge the MFP 10 when a service request is issued, an unauthorized retry request by a user different from the authorized use (i.e., the user who requested for the service) can be prevented.

It should be noted that the invention need not be limited to the configuration of the above-described illustrative embodiment, and can be modified in various ways in accordance with aspects of the invention.

For example, according to the illustrative embodiment, when the pages to be retransmitted are designated by the user of the MFP 10, the designating method is instructed, based on the contents of the print data, from the function server 20 to the MFP 10 (S407-S409). This configuration may be modified such that the user of the MFP 10 selects the designation method, as described in detail below.

The MFP 10 may be configured such that, when the retry is requested, the a retry selection window is displayed on the display 53 of the operation panel 12a so that the user of the MFP 10 can select one of the first retry and the second retry. If the first retry is selected through the retry selection window, the read/delete selection window (see FIG. 3B) allowing the user to select one of (a) reading of the recording sheets on which images have not been printed normally, and (b) deletion of the print data stored in the function server.

If the second retry is selected through the retry selection window, the MFP 10 displays an input/delete selection window (see FIG. 3C) allowing the user to select one of (a) input of the page numbers of the recording sheets on which images have not been printed normally, or (b) deletion of the print data stored in the function server 20 to retry the selected service on the display 53 of the operation panel 12a.

According to such a configuration, the user of the MFP 10 can select the first or second retries, whichever easier, based on a condition.

Further, in the communication system according to the illustrative embodiment, the print data stored in the service output information storage 26 of the function server 20 can be deleted by the operation of the user of the MFP 10 (S211: YES, S216: YES, S222, S405). According to this configuration, a large amount of print data may be stored in the service output information storage 26.

In order to avoid such a condition, when a service request from the MFP 10 to the function server 20 is made (i.e., when, based on a user's request, print data different from the print data for retry stored in relation to the user), the print data stored in relation to the user (i.e., the print data the user requested in the past) is deleted from the service output information storage 26.

That is, if a user, who once requested the service, makes another service request other than the retry request for the service, the control may determine that the retry of the previous service is unnecessary (i.e., the images of the previous service have been printed normally), and delete the print data regarding the previous service. With such a configuration, the capacity necessary fro the service output information storage 26 can be minimized.

According to the illustrative embodiment described above, the barcode printed on the recording sheet is analyzed by the MFP 10 (S213). This configuration can be modified such that, for example, the bar code is analyzed by the function server 20. For example, image data representing the barcode image is transmitted from the MFP 10 to the function server 20, and the function server 20 analyzes the barcode represented by the received image. With this configuration, a program necessary for analyzing the barcode need not be installed in the MFP 10, and the capacity of the memory of the MFP 10 be reduced.

According to the illustrative embodiment, the recording sheets on which the images have not been printed normally should be read by the reading unit 13 to designate the pages to be retransmitted. The invention need not be limited to this configuration. For example, the communication system may be configured such that, when the reading unit 13 reads a certain page of the recording sheet, all the pages after the page read by the reading unit 13 may be designated. With this configuration, if a certain error in which images have not been printed on all the pages following a certain page occurs (e.g., lack of ink/toner etc.), only by a simple operation of having the first sheet read by the reading unit 13, all the page numbers for retransmission can be designated.

In another modification, al the pages between two pages read by the reading unit 13 may be designated as the page numbers for retransmission. With such a configuration, even if the reading unit is not provided with the ADF, only by reading two sheets of the recording sheets, al the pages therebetween is subjected to the retry, which reduces the troublesome operation of the user.

According to another aspect, not the page read by the reading unit 13, by the page next to the page read by the reading unit 13 is designated. For example, if there is a page on which the barcode is not printed well, according to this configuration, by having the previous page read by the reading unit 13, the page to be retransmitted can be designated. In another example, this configuration is also effective when two recording sheets are partially overlapped and fed when an image is printed. In such a case, if the sheet read by the reading unit 13 represents the page to be transmitted, the user may be unsure as to which of the two sheets should be read by the reading unit 13. However, if the page number next to that of the sheet read by the reading unit 13 represents the designated page, the designation can be made easily and accurately. It should be noted that, regarding the case where the partially overlapped two sheets are fed and an image is printed thereon, both of the sheets may be read by the reading unit 13, and the retry is done for the sheet from which the barcode is recognized.

According to the illustrative embodiment, the user of the MFP 10 judges whether an image is printed on a recording sheet normally, and requests the function server 20 to retransmit the print data of the pages of the recording sheets on which images have not been printed normally. If the MFP 10 is configured such that a state that the image is not normally printed can be detected, the MFP 10 may be configured to automatically request the function server for retransmission of the print data, without the user's operation.

According to the illustrative embodiment, the function server 20 judges whether a user who requested for the service and a user who requested for retransmission of the print data for the service coincide with each other. If the users do not coincide, the function server 20 deletes the print data (S402: NO, S405). The invention need not be limited to this configuration.

For example, a process similar to a case where the user IDs coincide (e.g., when password is wrong, etc.) may be executed (i.e., a process when decision in S402 is YES). That is, the control may not delete the print data, and simply prohibit the print data from being retransmitted. With such a configuration, even after the retry request by an unauthorized user, the retry request by the authorized user can be processed.

In the illustrative embodiment, in order to allow the user to easily select a service for which retry is requested, a list of service names are displayed in the retry service selection window (see FIG. 3A). According to aspects of the invention, optionally or alternatively, the usage date/time of each service may be displayed on the retry service selection window. With such a configuration, the user can easily recognize each service even if the user used the same service a plurality of times.

What is claimed is:

1. A communication system comprising a printing apparatus and a data transmitting apparatus configured to transmit image data corresponding to at least one service to the printing apparatus, the printing apparatus and the data transmitting apparatus configured to communicate with each other,
    wherein the printing apparatus comprises:
        a service requesting unit configured to request the data transmitting apparatus to perform the at least one service;
        a printing unit configured to print images represented by the image data transmitted from the data transmitting apparatus on recording media;
        a recording medium information input unit configured to accept information identifying a portion of the recording media on which at least one of the images has not been printed normally, even though the printing has been completed and the printing apparatus has not detected an error; and
        a retransmission requesting unit configured to request the data transmitting apparatus to retransmit particular image data corresponding to the identified portion of the recording media in accordance with the identifying information accepted by the recording medium information input unit,
    wherein a permitting condition is associated with each service,
    wherein the data transmitting apparatus comprises:
        an image data generating unit configured to generate the image data corresponding to the requested service;
        an image data transmitting unit configured to transmit the image data generated by the image data generating unit to the printing apparatus in response to the service request;
        an image data storage unit configured to store the image data transmitted to the printing apparatus; and
        an image data retransmitting unit configured such that, when retransmission of the particular image data is requested by the printing apparatus and the permitting condition associated with the requested service corresponding to the particular image data is met, the image data retransmitting unit retrieves the particular image data corresponding to the identified portion of the recording media from the image data storing unit and transmits the particular image data to the printing apparatus,
        wherein the image data retransmitting unit transmits the particular image data to the printing apparatus when the permitting condition indicates that retransmission is allowed, and
        wherein the image data retransmitting unit does not transmit the particular image data to the printing apparatus when the permitting condition indicates that retransmission is inhibited,
    wherein the printing apparatus further comprises:
        a register unit configured to store a list of requested services corresponding to the printed data for which retransmission of the corresponding image data is allowed; and
        a display unit configured to display the list,
        wherein the recording medium information input unit comprises an operation panel configured to accept a selection of one of the services displayed in the list as the identifying information,
    wherein the data transmitting apparatus further comprises:
        a permitting condition transmitting unit configured to transmit the permitting condition of the requested service to the printing apparatus, when printing of the requested service is complete,
    wherein the register unit stores the requested service in the list, when the permitting condition of the requested service indicates that retransmission is allowed, and
    wherein the register unit does not store the requested service in the list, when the permitting condition of the requested service indicates that retransmission is inhibited.

2. The communication system according to claim 1, wherein the operation panel is configured to accept an input of a page number of the identified recording medium.

3. The communication system according to claim 2,
    wherein the recording medium information input unit comprises an image reading unit configured to read an identifying image of the identified portion of the recording media,
    wherein the retransmission requesting unit comprises:
    a first retransmission requesting unit configured to request the data transmitting apparatus to retransmit the particular image data corresponding to the identified portion of the recording media in accordance with the information input through the recording medium information inputting unit; and
    a second retransmission requesting unit configured to request the data transmitting apparatus to retransmit the particular image data corresponding to the identified portion of the recording media in accordance with the identifying image read by the image reading unit,
    wherein the data transmitting apparatus further comprises:
    a request selecting unit configured to select one of the first retransmission requesting unit and the second retransmission requesting unit based on the particular image data to be transmitted to the printing apparatus,
    wherein, when retransmission of the particular image data is requested by one of the first retransmission requesting unit and the second retransmission requesting unit selected by the request selecting unit, the image data retransmitting unit retrieves the particular image data from the image data storing unit and transmits the retrieved image data to the printing apparatus.

4. The communication system according to claim 3,
    wherein the data transmitting apparatus further comprises a retransmission instructing unit that instructs the printing apparatus to request for retransmission of the particular image data with the one of the first retransmission requesting unit and the second retransmission requesting unit selected by the request selecting unit, and
    wherein the printing apparatus request for the retransmission through the one of the first retransmission requesting unit and the second retransmission requesting unit selected by the request selecting unit is instructed by the data transmitting apparatus.

5. The communication system according to claim 1,
    wherein the recording medium information input unit comprises an image reading unit configured to read an identifying image of the portion of the recording media on which at least one of the images has not been printed normally, and wherein the retransmission requesting unit requests the data transmitting apparatus to retransmit the particular image data in accordance with the identifying image read by the image reading unit.

6. The communication system according to claim 5, wherein the printing unit is configured to print an identifying image on each recording medium together with the images represented by the image data.

7. The communication system according to claim 5, wherein the reading unit is configured to read identifying images from a plurality of recording mediums one after another.

8. The communication system according to claim 1, the data transmitting apparatus deletes the image data stored in the image data storage unit when image data different from the image data stored in the image data storage unit is transmitted to the printing apparatus.

9. The communication system according to claim 1, wherein the printing apparatus further comprises:
a deletion selecting unit configured to accept a selection of image data to be deleted from the image data storage unit of the data transmitting apparatus; and
a deletion requesting unit configured to request the data transmitting apparatus to delete the image data selected by the deletion selecting unit, and
wherein the data transmitting apparatus further comprises:
a deleting unit that deletes the image data which is requested to be deleted by the printing apparatus.

10. The communication system according to claim 1, wherein the printing apparatus further comprises:
a user information inputting unit configured to accept identification information of a user requesting the data transmitting unit for the image data; and
a user information transmitting unit configured to transmit the user identification information input through the user information inputting unit to the data transmitting apparatus,
wherein the image data storing unit is configured to store the image data transmitted to the printing apparatus in association with the user identification information of the user who requested for the image data, and
wherein the image data storing unit is configured not to store the image data if particular identification information of a user who requested for the retransmission of the image data is different from further identification information of a user who requested for the image data to be stored in the image data storage unit.

11. A printing apparatus for a communication system, the communication system comprising the printing apparatus and a data transmitting apparatus, the data transmitting apparatus configured to transmit image data corresponding to at least one service to the printing apparatus, and the printing apparatus and the data transmitting apparatus configured to communicate with each other,
wherein the printing apparatus comprises:
a service requesting unit configured to request the data transmitting apparatus to perform the at least one service;
a printing unit configured to print an image represented by the image data transmitted from the data transmitting apparatus on a recording medium;
a recording medium information input unit configured to accept information identifying the recording medium when the image has not been printed normally, even though the printing has been completed and the printing apparatus has not detected an error;
a retransmission requesting unit configured to request the data transmitting apparatus to retransmit particular image data corresponding to the identified recording medium in accordance with the identifying information accepted by the recording medium information input unit;
a register unit configured to store a list of requested services corresponding to the printed data for which retransmission of the corresponding image data is allowed;
a display unit configured to display the list; and
the recording medium information input unit comprises an operation panel configured to accept a selection of one of the services displayed in the list as the identifying information;
wherein the data transmitting apparatus comprises:
a permitting condition transmitting unit configured to transmit a permitting condition of the requested service to the printing apparatus, when printing of the requested service is complete;
wherein the register unit stores the requested service in the list, when the permitting condition of the requested service indicates that retransmission is allowed, and
wherein the register unit does not store the requested service in the list, when the permitting condition of the requested service indicates that retransmission is inhibited.

12. The printing apparatus according to claim 11, wherein the recording medium information input unit comprises an operation panel configured to accept an input of a page number of the identified recording medium.

13. The printing apparatus according to claim 11, wherein the recording medium information input unit includes an image reading unit configured to read an identifying image of the recording medium on which the image has not been printed normally, and
wherein the retransmission requesting unit requests the data transmitting apparatus to retransmit image data in accordance with the identifying image read by the image reading unit.

14. A communication system comprising a printing apparatus and a data transmitting apparatus configured to transmit image data corresponding to at least one service to the printing apparatus, the printing apparatus and the data transmitting apparatus configured to communicate with each other,
wherein the printing apparatus comprises:
a service requesting unit configured to request the data transmitting apparatus to perform the at least one service;
a printing unit configured to print images represented by the image data transmitted from the data transmitting apparatus on recording media;
a recording medium information inputting unit configured to accept an input of information identifying a portion of the recording media on which at least one of the images has not been printed normally, even though the printing has been completed and the printing apparatus has not detected an error;
an image reading unit configured to read an identifying image of the identified portion of the recording media;
a first retransmission requesting unit configured to request the data transmitting apparatus to retransmit particular image data corresponding to the identified portion of the recording media in accordance with the information input through the recording medium information inputting unit; and a second retransmission requesting unit configured to request the data transmitting apparatus to retransmit the particular image data corresponding to the identified portion of the recording media in accordance with the identifying image read by the image reading unit,
a request selecting unit configured to accept a selection of the first retransmission requesting unit or the second retransmission requesting unit, retransmission of the particular image data being requested using the selected one of the first retransmission requesting unit and the second retransmission requesting unit selected by the request selecting unit, wherein a permitting condition is associated with each service, wherein the data transmitting apparatus comprises:
an image data generating unit configured to generate the image data corresponding to the requested service;
an image data transmitting unit configured to transmit the image data generated by the image data generating unit to the printing apparatus in response to the service request;
an image data storage unit configured to store the image data transmitted to the printing apparatus; and
an image data retransmitting unit configured such that, when retransmission of the particular image data is requested by the printing apparatus and the permitting condition associated with the requested service corresponding to the particular image data is met, the image data retransmitting unit retrieves the particular image data from the image data storing unit and transmits the retrieved image data to the printing apparatus, wherein the image data is transmitted to the printing apparatus when the permitting condition indicates that retransmission is allowed, wherein the image data is not transmitted to the printing apparatus when the permitting condition indicates that retransmission is inhibited, wherein the printing apparatus further comprises:
a register unit configured to store a list of requested services corresponding to the printed data for which retransmission of the corresponding image data is allowed; and
a display unit configured to display the list,
wherein the recording medium information input unit comprises an operation panel configured to accept a selection of one of the services displayed in the list as the identifying information, wherein the data transmitting apparatus further comprises:
a permitting condition transmitting unit configured to transmit the permitting condition of the requested service to the printing apparatus, when printing of the requested service is complete, wherein the register unit stores the requested service in the list, when the permitting condition of the requested service indicates that retransmission is allowed, and wherein the register unit does not store the requested service in the list, when the permitting condition of the requested service indicates that retransmission is inhibited.

* * * * *